US012093958B2

(12) United States Patent
Avetisov et al.

(10) Patent No.: US 12,093,958 B2
(45) Date of Patent: *Sep. 17, 2024

(54) SYSTEMS AND METHODS FOR FACILITATING SPENDING DIGITAL CURRENCY WITHOUT OWNING DIGITAL CURRENCY

(71) Applicant: HYPR Corp., New York, NY (US)

(72) Inventors: George Avetisov, New York, NY (US); Roman Kadinsky, New York, NY (US); Bojan Simic, New York, NY (US)

(73) Assignee: HYPR CORP., New York, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/740,106

(22) Filed: May 9, 2022

(65) Prior Publication Data

US 2022/0405764 A1    Dec. 22, 2022

Related U.S. Application Data

(63) Continuation of application No. 14/538,764, filed on Nov. 11, 2014, now Pat. No. 11,354,665.

(51) Int. Cl.
  *G06Q 20/40*  (2012.01)
  *G06Q 20/10*  (2012.01)
  *G06Q 20/32*  (2012.01)

(52) U.S. Cl.
  CPC ....... *G06Q 20/40145* (2013.01); *G06Q 20/10* (2013.01); *G06Q 20/3278* (2013.01)

(58) Field of Classification Search
  CPC ............. G06Q 20/40145; G06Q 20/10; G06Q 20/3278
  See application file for complete search history.

(56) References Cited

U.S. PATENT DOCUMENTS

| 6,393,563 B1 * | 5/2002 | Maruyama | H04L 9/3247 713/168 |
| 2007/0168266 A1 * | 7/2007 | Questembert | G07F 19/00 235/379 |
| 2008/0103984 A1 * | 5/2008 | Choe | H04L 9/3228 705/16 |

(Continued)

*Primary Examiner* — John W Hayes
*Assistant Examiner* — Zehra Raza
(74) *Attorney, Agent, or Firm* — Pillsbury Winthrop Shaw Pittman, LLP

(57) ABSTRACT

Spending digital currency without owning digital currency may be facilitated. The user may use a software application running on the user's computing platform to scan a digital currency public address quick-response code (QR), or a near-field-communication (NFC) based public address. The user may be prompted to swipe-to-authenticate the transaction. The user may authenticate the transaction by fingerprint-swiping a biometric-enabled transitory password authentication device. The biometric-enabled transitory password authentication device may transmit an encrypted transitory password a server via the user's computing platform. Upon receiving and verifying the transaction, the server may send an amount of digital currency to the target address on behalf of the user. The server may charge the user's debit card an equivalent amount of sovereign currency.

31 Claims, 3 Drawing Sheets

(56) References Cited

U.S. PATENT DOCUMENTS

| | | | |
|---|---|---|---|
| 2012/0239567 A1* | 9/2012 | Choi | H04L 63/06 |
| | | | 705/41 |
| 2013/0166455 A1* | 6/2013 | Feigelson | H04L 9/3234 |
| | | | 705/64 |
| 2013/0262295 A1* | 10/2013 | Narayanan | G06Q 20/384 |
| | | | 705/39 |

* cited by examiner

SYSTEMS AND METHODS FOR FACILITATING SPENDING DIGITAL CURRENCY WITHOUT OWNING DIGITAL CURRENCY

CROSS-REFERENCE TO RELATED APPLICATIONS

This patent application is a continuation of U.S. patent application Ser. No. 14/538,764 filed 11 Nov. 2014, titled "SYSTEMS AND METHODS FOR FACILITATING SPENDING DIGITAL CURRENCY WITHOUT OWNING DIGITAL CURRENCY." The entire content of each aforementioned patent filing is hereby incorporated by reference.

FIELD OF THE DISCLOSURE

This disclosure relates to systems and methods for facilitating spending digital currency without owning digital currency.

BACKGROUND

Conventionally, one must own a digital currency (e.g., bitcoin) in order to spend digital currency. Thus, those not owning digital currency may be precluded from accepting any offers for goods or services for which digital currency is required, and may be restricted to accepting offers for goods or services for which sovereign currency is required.

Digital currency may include money used in commercial transactions that does not derive its value from government regulation or law and is not managed by a central monetary authority. Digital currency may be referred to as "cryptocurrency." A well-known example of a digital currency is Bitcoin, which is a peer-to-peer digital currency that is created by computer servers and used in electronic commercial transactions. Digital currency differs from virtual money in that digital currency is in general circulation and can be used to make purchases and payments for goods and services outside of a virtual economy, such as an online game. In recent years, interest in digital currency has increased due in part to widespread instability of the global economy and its impact on financial institutions. Many people are seeking greater stability in a currency that is not directly tied to a sovereign.

Sovereign currency may be money used in commercial transactions that derives its value from government regulation or law. Sovereign currency may be generally issued by a country or group of countries under management of a central monetary authority. Central monetary authorities, sometimes called central banks or reserve banks, may be government institutions that manage sovereign currencies, money supplies and interest rates of their respective countries. Central monetary authorities may oversee commercial banking systems of their respective countries. In contrast to commercial banks, central monetary authorities have a monopoly on increasing the monetary base and often also print currencies which serve as legal tender. Examples of central monetary authorities include the European Central Bank (ECB) and the Federal Reserve of the United States. Examples of sovereign currency include U.S. dollars ($), European Union euros (€), British pounds (£), and/or other sovereign currencies.

SUMMARY

One aspect of the disclosure relates to a system configured for facilitating spending digital currency without owning digital currency. In exemplary implementations, the system may allow a user spend digital currency without ever owning digital currency, by having the user's debit card (or other sovereign-currency-based account or system) charged in real-time while a spend is facilitated of an amount of digital currency equivalent (or approximately equivalent) in value what was charged to the user's debit card. The user may use a software application running on the user's computing platform to scan a digital currency public address quick-response code (QR), or a near-field-communication (NFC) based public address. The user may be prompted to swipe-to-authenticate the transaction. The user may authenticate the transaction by fingerprint-swiping a biometric-enabled transitory password authentication device. The biometric-enabled transitory password authentication device may transmit an encrypted transitory password a server via the user's computing platform. Upon receiving and verifying the transaction, the server may send an amount of digital currency to the target address on behalf of the user. The server may charge the user's debit card an equivalent (or approximately equivalent) amount of sovereign currency.

According to some implementations, the system may include a user computing platform communicatively coupled with the authentication device. The system may include one or more servers. The server(s) may be configured to communicate with the user computing platform according to a client/server architecture. A user may access the system via the user computing platform.

The authentication device may be configured to provide a biometric-enabled transitory password to facilitate secure authentication. The authentication device may include a tamper proof casing and internal components. The authentication device may be configured to run a secured and untethered operating system. The authentication device may be configured to be disposed proximate to the user computing platform. In some implementations, the authentication device may be configured to adhere to an external surface of the user computing platform. Such a form factor may be akin to a sticker that can be adhered, for example, to the back of a smartphone. In some implementations, the authentication device may be embodied within a case configured to removably attached to and cover a portion of user computing platform.

The authentication device may include one or more of a biometric sensor, a communications interface, a power supply, and/or other components. The biometric sensor may be configured to obtain a biometric sample from a user. The communications interface may be configured to provide communications capabilities to the authentication device. The power supply may be configured to provide electrical power to one or more components of the authentication device.

The authentication device may be configured to execute computer readable instructions. The computer readable instructions may include one or more of a biometric component, a transitory password component, a bio-pin component, an encryption component, a one-way communications component, and/or other components.

The biometric component may be configured to receive the biometric sample from the biometric sensor. The biometric component may be configured to verify the biometric sample obtained by the biometric sensor based on biometric information stored by the authentication device. In some implementations, verification of the biometric sample may be required in order to unlock the authentication device.

The transitory password component may be configured to provide a transitory password. The transitory password may change periodically based on passage of time. The transitory password may be provided responsive to the biometric sample being verified.

The bio-pin component may be configured to provide a bio-pin. The bio-pin may be an alphanumeric hash. The bio-pin may be based on one or more of a random number, a numeric representation of the biometric sample, a user code, and/or other information. A bio-pin associated with a given authentication device may be unique that device.

The encryption component may be configured to encrypt sensitive information stored by and/or transmitted by the authentication device. By way of non-limiting example, the sensitive information stored by and/or transmitted by the authentication device may include one or more of the transitory password provided by the transitory password component, a credit card number, a debit card number, an bank account number, a payment account number, a digital currency (e.g., bitcoin) private key, a password, other information pertaining to electronic payment platforms, and/or other sensitive information.

The one-way communications component may be configured to transmit information (e.g., the encrypted transitory password) to the user computing platform. The one-way communications component may be configured such that, while information may be transmitted by the authentication device, no information may be received by the authentication device. In some implementations, verification of the biometric sample may be required in order for the one-way communications component to allow information to be transmitted from the authentication device.

Referring now to the user computing platform, it may be configured to execute computer readable instructions. The computer readable instructions may include one or more of a user code component, an unlock-app component, a public address component, a user interface component, a user prompt component, an authentication initiation component, a transaction component, and/or other components.

The user code component may be configured to obtain a user code from a user. The unlock-app component may be configured to unlock an application running on the user computing platform responsive to the correct user code being obtained by the user code component.

The public address component may be configured to obtain a public address of a target recipient of digital currency. The public address may be obtained in various manners. In some implementations, a quick-response (QR) code may include the public address. In some implementations, the public address may be obtained as a near-field-communication (NFC) based public address.

The user interface component may be configured to provide a user interface presented via the user computing platform. In some implementations, the user interface may be configured to receive user instructions to perform a transaction that requires authentication. The transaction may include sending an amount of digital currency to a target recipient. The target recipient may include any entity that can possess digital currency. Examples of such entities may include individual persons and legal entities (e.g., corporations, partnerships, etc.). The digital currency may be sent to the target recipient as payment for goods and/or services. The digital currency may be sent to transfer wealth from one location to another.

The user prompt component may be configured to provide a prompt for the user to swipe-to-authenticate the transaction. "Swipe-to-authenticate" may include providing a biometric sample via the authentication device. In some implementations, swipe to authentication may include swiping a finger past the biometric sensor of the authentication device. The prompt may be presented visually via the user interface provided by the user interface component. The prompt may be presented audibly, haptically, and/or other manners for prompting the user. The prompt may include any indication to the user which the user will recognize as a cue to provide a biometric sample.

The authentication initiation component may be configured to prompt the authentication device. The prompt may be configured to cause the authentication device to "wake up," turn on, become activated, and/or otherwise become ready to receive a biometric sample.

The transaction component may be configured to receive the transitory password (which may be encrypted) from the authentication device. In some implementations, the transitory password may be provided from the authentication device to the user computing platform only after (1) the user code has been successfully provided via the user computing platform and (2) the biometric sample has been successfully obtained and verified by the authentication device. The transaction component may be configured to sign transaction information associated with the transaction. Signing the transaction information may be based on the encrypted transitory password. The transaction information may be encrypted based on the encrypted transitory password. The transaction information may include information that describes the transaction and/or information that is necessary to perform the transaction. The transaction component may be configured to transmit the encrypted transitory password with the signed transaction information to the server(s).

Referring now to the server(s), they may be configured to execute computer readable instructions. The computer readable instructions may include one or more of a communications component, a decryption component, a server-side transitory password component, a verification component, a server-side transaction component, and/or other components.

The communications component may be configured to receive the encrypted transitory password from the user computing platform. The communications component may be configured to receive the signed transaction information from the user computing platform.

The decryption component may be configured to decrypt information received from the user computing platform. The decryption component may be configured to decrypt the encrypted transitory password. The decryption component may be configured to decrypt the signed transaction information.

The server-side transitory password component may be configured to provide a server-side transitory password that changes periodically based on passage of time. The server-side transitory password may be provided synchronously with the transitory password provided by the authentication device. The server-side transitory password may be the same as the transitory password provided by the authentication device.

The verification component may be configured to verify the user by determining whether the transitory password received from the user computing platform, once decrypted, is valid. Determining the validity of the decrypted transitory password may include determining whether the decrypted transitory password matches the server-side transitory password.

The server-side transaction component may be configured to facilitate the transaction responsive to the user being verified. Facilitating the transaction may include effectuating an amount of digital currency being sent to the target recipient. The digital currency may be sent to the target recipient as payment for goods and/or services. The digital currency may be sent to transfer wealth from one location to another. The server-side transaction component may be configured to possess and/or otherwise manages a digital currency wallet (e.g., bitcoin hot wallet) from which the amount of digital currency is sent.

The server-side transaction component may be configured to facilitate a charge to a user's sovereign currency account for an equivalent amount of sovereign currency may be sent to a financial institution. The amount of sovereign currency that is equivalent to the amount of digital currency sent to the target recipient may be determined by the server-side transaction component based on an exchange rate. The user's sovereign currency account may include a bank account, a credit account, and/or other accounts based on sovereign currency. As such, the financial institution may be a bank, a financial services corporation, and/or other institution dealing with sovereign currency. In some implementations, the server-side transaction component may be configured to charge a debit card tied to the user's bank account. In some implementations, the server-side transaction component may be configured to charge a credit card associated with the user. In some implementations, the server-side transaction component may be configured to use an electronic check in order to charge the user's bank account. Other approaches for facilitating a charge to the user's sovereign currency account are contemplated and are within the scope of the disclosure.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
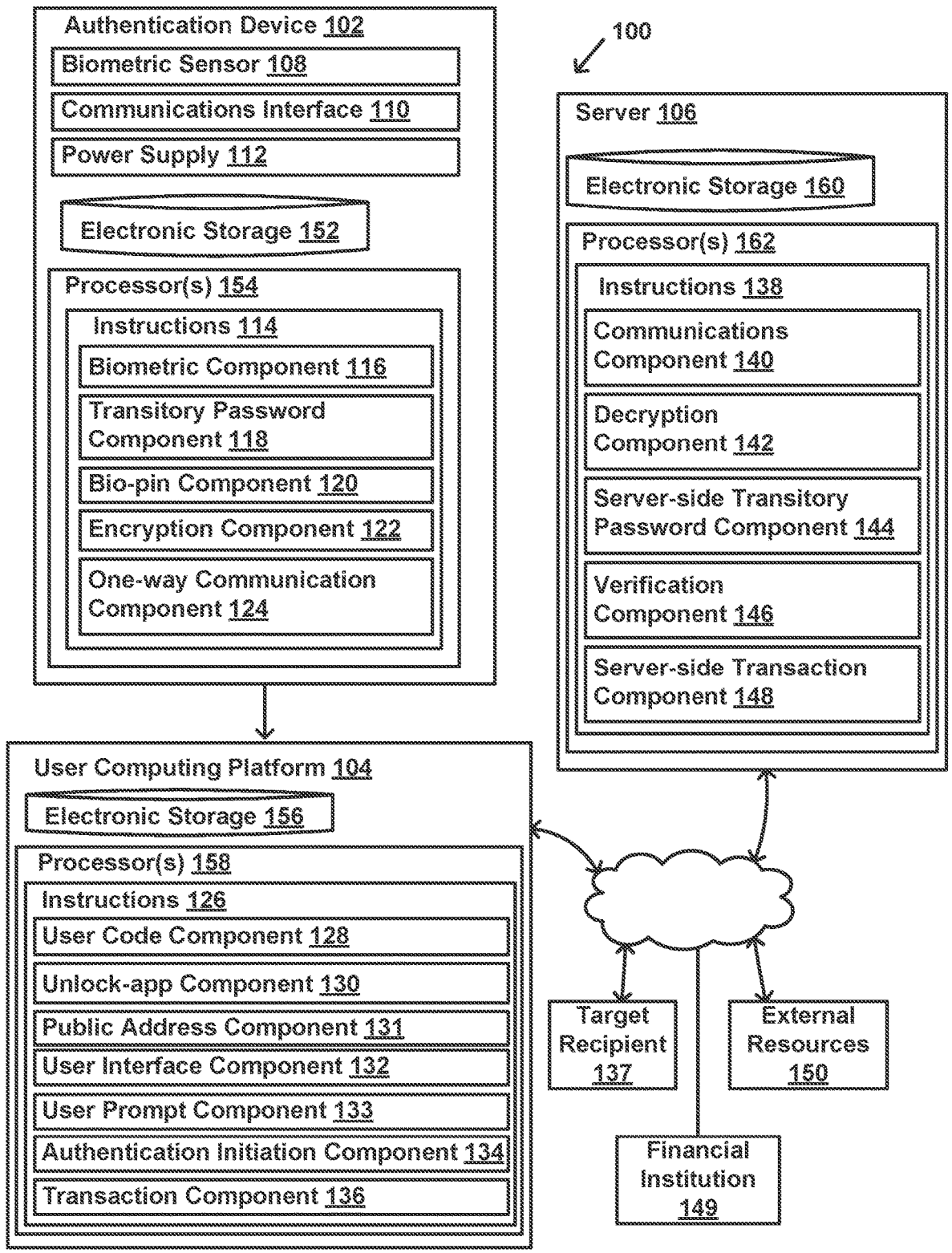
FIG. 1 illustrates a system configured for facilitating spending digital currency without owning digital currency, in accordance with one or more implementations.

FIG. 1 illustrates a system 100 configured for facilitating spending digital currency without owning digital currency, in accordance with one or more implementations. The system 100 may include a user computing platform 104 communicatively coupled with authentication device 102. The system 100 may include one or more servers 106. The server(s) 106 may be configured to communicate with user computing platform 104 according to a client/server architecture. A user may access system 100 via user computing platform 104.

The authentication device 102 may be configured to provide a biometric-enabled transitory password to facilitate secure authentication. The authentication device 102 may include a tamper proof casing and internal components. The authentication device 102 may be configured to run a secured and untethered operating system. The authentication device 102 may be configured to be disposed proximate to user computing platform 104. In some implementations, authentication device 102 may be configured to adhere to an external surface of user computing platform 104. Such a form factor may be akin to a sticker that can be adhered, for example, to the back of a smartphone. In some implementations, authentication device 102 may be embodied within a case configured to removably attached to and cover a portion of user computing platform. The authentication device 102 may include one or more of a biometric sensor 108, a communications interface 110, a power supply 112, and/or other components.

The biometric sensor 108 may be configured to obtain a biometric sample from a user. A biometric sample (also referred as a biometric identifier) may describe distinctive, measurable characteristics used to label and describe individuals. According to various implementations, the biometric sample may include one or more of fingerprint, palm veins, face recognition, DNA, palm print, hand geometry, iris recognition, retina, odor/scent, and/or other biometric samples. By way of non-limiting example, authentication device 102 may include a fingerprint scanner and/or other imaging technology configured to obtain information associated with fingerprint, palm veins, face recognition, DNA, palm print, hand geometry, iris recognition, retina, odor/scent, and/or other biometric samples. In some implementations, biometric sensor 108 may include a FPC-1080A fingerprint swipe scanner. In some implementations, the biometric sample may include behavioral characteristics related to the pattern of behavior of the user, which may be referred to as behaviometrics. The behaviometrics may include one or more of typing rhythm, gait, voice, and/or other behaviometrics.

The communications interface 110 may be configured to provide communications capabilities to authentication device 102. In some implementations, authentication device 102 may be configured for one-way communication such that information is transmitted from authentication device 102 to other locations (e.g., user computing platform 104) but no information is received by authentication device 102. Such a communications approach may wholly prevent or greatly alleviate the probability of authentication device 102 being hacked, tampered with, and/or otherwise compromised because foreign software code (e.g., computer viruses) cannot be introduced into authentication device 102. In some implementations, communications interface 110 may include a wireless technology standard for transmitting data over short distances such as Bluetooth, ZigBee, RuBee, and/or other suitable standards.

The power supply 112 may be configured to provide electrical power to one or more components of authentication device 102. The power supply 112 may include one or more of a battery, a capacitor, a solar cell, an electromagnetic induction circuit, and/or other power supplies. In some implementations, power supply 112 may include a rechargeable battery. In some implementations, power supply 112 may include a battery that stores sufficient electrical power to supply one or more components of authentication device 102 without charging for the lifetime of authentication device 102 (e.g., a month, several months, a year, several years, and/or other durations).

The authentication device 102 may be configured to execute computer readable instructions 114. The computer readable instructions 114 may include one or more of a biometric component 116, a transitory password component 118, a bio-pin component 120, an encryption component 122, a one-way communications component 124, and/or other components.

The biometric component 116 may be configured to receive the biometric sample from biometric sensor 108. The biometric component 116 may be configured to verify the biometric sample obtained by biometric sensor 108 based on biometric information stored by authentication device 102. In some implementations, verification of the biometric sample may be required in order to unlock authentication device 102. The biometric information stored by authentication device 102 and used to verify the biometric sample obtained by biometric sensor 108 may include an exemplar or template of the biometric sample. The biometric information may be stored by authentication device 102 during an initialization process during which the user provides the sample during set up of authentication device 102. The biometric information may be stored by authentication device 102 during manufacture of authentication device 102. By way of non-limiting example, a biometric sample comprising a fingerprint obtained by biometric sensor 108 may be verified by matching the fingerprint to a fingerprint exemplar or template stored by authentication device 102. In some implementations, biometric component 116 may utilize a fingerprint matching algorithm that is the same as or similar to the FPC-1080A matching algorithm available from Fingerprints Cards AB of Gothenburg, Sweden.

The transitory password component 118 may be configured to provide a transitory password. The transitory password may change periodically based on passage of time. The transitory password may be provided responsive to the biometric sample being verified. In some implementations, the transitory password may be a time-based one-time password (TOTP). The TOTP may be provided by an algorithm that computes a one-time password from a shared secret key and a current time. The TOTP may operate on Unix Time.

The bio-pin component 120 may be configured to provide a bio-pin. The bio-pin may be an alphanumeric hash. The bio-pin may be based on one or more of a random number, a numeric representation of the biometric sample, a user code, and/or other information. A bio-pin associated with a given authentication device 102 may be unique that device. In some implementations, the random number may be a "true" random number provided based on a measured physical phenomenon that is expected to be random. By way of non-limiting example, the measured physical phenomenon may include one or more of photons impinging on an imaging device (e.g., a charge-coupled device or CCD) atmospheric noise, thermal noise, cosmic background radiation, radioactive decay, other external electromagnetic and quantum phenomena, and/or other physical phenomena. The numeric representation of the biometric sample may be determined based on a numeric code sequence for a fingerprint image based on ridge flow patterns of the fingerprint. Other approaches for numerically representing a biometric sample are contemplated and are within the scope of the disclosure. The user code may by a code provided by the user. The user code may be an alphanumeric code. In some implementations, the user code may be a for digit number.

In some implementations, the bio-pin may be the master seed for generation of some or all wallet chains managed by system 100. For example, some or all wallet chains and/or public keys belonging to a user may be generated as the result of a hash resulting from the bio-pin. In some implementations, a wallet chain may be based on a bio-pin and the transitory password (e.g., TOTP) provided by transitory password component 118.

The encryption component 122 may be configured to encrypt sensitive information stored by and/or transmitted by authentication device 102. By way of non-limiting example, the sensitive information stored by and/or transmitted by authentication device 102 may include one or more of the transitory password provided by transitory password component 118, a credit card number, a debit card number, an bank account number, a payment account number, a digital currency (e.g., bitcoin) private key, a password, other information pertaining to electronic payment platforms, and/or other sensitive information. In some implementations, encryption component 122 may utilize 512 bit elliptic curve cryptography for PCI. Other encryption techniques are contemplated and are within the scope of the disclosure.

The one-way communications component 124 may be configured to transmit information (e.g., the encrypted transitory password) to user computing platform 104. The one-way communications component 124 may be configured such that, while information may be transmitted by authentication device 102, no information may be received by authentication device 102. In some implementations, verification of the biometric sample may be required in order for one-way communications component 124 to allow information to be transmitted from authentication device 102.

As described further herein, authentication device 102 may receive a prompt from user computing platform 104 that causes authentication device 102 to "wake up," turn on, become activated, and/or otherwise become ready to receive a biometric sample. Such a prompt, however, may not include any information that can corrupt authentication device 102 and may merely function to activate authentication device 102 from a power-saving mode.

Referring now to user computing platform 104 depicted in FIG. 1, it may be configured to execute computer readable instructions 126. The computer readable instructions 126 may include one or more of a user code component 128, an unlock-app component 130, a public address component 131, a user interface component 132, a user prompt component 133, an authentication initiation component 134, a transaction component 136, and/or other components.

The user code component 128 may be configured to obtain a user code from a user. The user code may be provided by the user via user computing platform 104. In some implementations, the user may enter the user code on a keypad of user computing platform 104. The user may provide the user code using a voice command received by user computing platform 104. The user code may be the same as or different from the user code utilized by bio-pin component 120 of authentication device 102.

The unlock-app component 130 may be configured to unlock an application running on user computing platform 104 responsive to the correct user code being obtained by user code component 128. In some implementations, unlocking the application may include allowing the application to open. In some implementations, unlocking the application may include enabling one or more features of the application when it is already running on user computing platform 104.

The public address component 131 may be configured to obtain a public address of a target recipient (e.g., target recipient 137) of digital currency. The public address may be obtained in various manners. In some implementations, a quick-response (QR) code may include the public address. The QR code may be obtained using a camera or QR code reader. The user computing platform 104 may include the camera (not depicted) and/or QR code reader (not depicted). The QR code may be interpreted by public address component 131 in order to determine the public address. In some implementations, the public address may be obtained as a near-field-communication (NFC) based public address. The user computing platform 104 may include an NFC communications apparatus configured to facilitate obtaining NFC based public addresses. In some implementations, public addresses may be obtained manually via user computing platform 104. Other approaches for obtaining public addresses are contemplated and are within the scope of the disclosure.

The user interface component 132 may be configured to provide a user interface presented via user computing platform 104. The user interface may be a graphical user interface (GUI). The user interface may be configured to provide information to the user. In some implementations, the user interface may be configured to present information associated with one or more transactions. The user interface may be configured to receive information from the user. In some implementations, the user interface may be configured to receive user instructions to perform a transaction that requires authentication. The user instructions may include a selection of a transaction, a command to perform a transaction, and/or information associated with a transaction. The transaction may include sending an amount of digital currency to a target recipient. The target recipient may include any entity that can possess digital currency. Examples of such entities may include individual persons and legal entities (e.g., corporations, partnerships, etc.). The digital currency may be sent to the target recipient as payment for goods and/or services. The digital currency may be sent to transfer wealth from one location to another.

The user prompt component 133 may be configured to provide a prompt for the user to swipe-to-authenticate the transaction. "Swipe-to-authenticate" may include providing a biometric sample via authentication device 102. In some implementations, swipe to authentication may include swiping a finger past biometric sensor 108 of authentication device 102. The prompt may be presented visually via the user interface provided by user interface component 132. The prompt may be presented audibly, haptically, and/or other manners for prompting the user. The prompt may include any indication to the user which the user will recognize as a cue to provide a biometric sample.

The authentication initiation component 134 may be configured to prompt authentication device 102. The prompt may be configured to cause authentication device 102 to "wake up," turn on, become activated, and/or otherwise become ready to receive a biometric sample. Such a prompt, however, may not include any information that can corrupt authentication device 102 and may merely function to activate authentication device 102 from a power-saving mode. Once the biometric sample is received and verified by authentication device 102, authentication device 102 may provide the transitory password (which may be encrypted) to user computing platform 104.

The transaction component 136 may be configured to receive the transitory password (which may be encrypted) from authentication device 102. In some implementations, the transitory password may be provided from authentication device 102 to user computing platform 104 only after (1) the user code has been successfully provided via user computing platform 104 and (2) the biometric sample has been successfully obtained and verified by authentication device 102. The transaction component 136 may be configured to sign transaction information associated with the transaction. Signing the transaction information may be based on the encrypted transitory password. The transaction information may be encrypted based on the encrypted transitory password. The transaction information may include information that describes the transaction and/or information that is necessary to perform the transaction. The transaction component 136 may be configured to transmit the encrypted transitory password with the signed transaction information to server(s) 106.

Referring now to server(s) 106 depicted in FIG. 1, they may be configured to execute computer readable instructions 138. The computer readable instructions 138 may include one or more of a communications component 140, a decryption component 142, a server-side transitory password component 144, a verification component 146, a server-side transaction component 148, and/or other components.

The communications component 140 may be configured to receive the encrypted transitory password from user computing platform 102. The communications component 140 may be configured to receive the signed transaction information from user computing platform 102.

The decryption component 142 may be configured to decrypt information received from user computing platform 102. The decryption component 142 may be configured to decrypt the encrypted transitory password. The decryption component 142 may be configured to decrypt the signed transaction information.

The server-side transitory password component 144 may be configured to provide a server-side transitory password that changes periodically based on passage of time. In some implementations, the transitory password may be a time-based one-time password (TOTP). The TOTP may be provided by an algorithm that computes a one-time password from a shared secret key and a current time. The TOTP may operate on Unix Time. The server-side transitory password may be provided synchronously with the transitory password provided by authentication device 102. The server-side transitory password may be the same as the transitory password provided by authentication device 102.

The verification component 146 may be configured to verify the user by determining whether the transitory password received from user computing platform 104, once decrypted, is valid. Determining the validity of the decrypted transitory password may include determining whether the decrypted transitory password matches the server-side transitory password.

The server-side transaction component 148 may be configured to facilitate the transaction responsive to the user being verified. Facilitating the transaction may include effectuating an amount of digital currency being sent to the target recipient. The digital currency may be sent to the target recipient as payment for goods and/or services. The digital currency may be sent to transfer wealth from one location to another. The server-side transaction component 148 may be configured to possess and/or otherwise manages a digital currency wallet (e.g., bitcoin hot wallet) from which the amount of digital currency is sent.

The server-side transaction component 148 may be configured to facilitate a charge to a user's sovereign currency account for an equivalent (or approximately equivalent) amount of sovereign currency may be sent to a financial institution (e.g., financial institution 149). The amount of sovereign currency that is equivalent (or approximately equivalent) to the amount of digital currency sent to the target recipient may be determined by server-side transaction component 148 based on an exchange rate. The exchange rate may change over time. The change may be continuous or periodic (e.g., every hour, every day, and/or other periods). In some implementations, sending digital currency to the target recipient and charging the user's sovereign currency account may occur at the same time, at approximately the same time, and/or at different times. By way of non-limiting example, digital currency may be sent to the target recipient at some time during a day and the user's sovereign currency account may be charged at the end of the day.

The user's sovereign currency account may include a bank account, a credit account, and/or other accounts based on sovereign currency. As such, the financial institution may be a bank, a financial services corporation, and/or other institution dealing with sovereign currency. In some implementations, server-side transaction component 148 may be configured to charge a debit card tied to the user's bank account. In some implementations, server-side transaction component 148 may be configured to charge a credit card associated with the user. In some implementations, server-side transaction component 148 may be configured to use an electronic check in order to charge the user's bank account. Other approaches for facilitating a charge to the user's sovereign currency account are contemplated and are within the scope of the disclosure.

In some implementations, server(s) 106, user computing platform 104, and/or external resources 150 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 106, user computing platform 104, and/or external resources 150 may be operatively linked via some other communication media.

External resources 150 may include sources of information, hosts and/or providers of transaction platforms outside of system 100, external entities participating with system 100, and/or other resources. In some implementations, some or all of the functionality attributed herein to external resources 150 may be provided by resources included in system 100.

The authentication device 102 may include electronic storage 152, one or more processors 154, and/or other components. Illustration of user authentication device 102 in FIG. 1 is not intended to be limiting. The authentication device 102 may include a plurality of hardware, software, and/or firmware components operating together to provide the functionality attributed herein to authentication device 102.

The user computing platform 104 may include electronic storage 156, one or more processors 158, and/or other components. The user computing platform 104 may include communication lines, or ports to enable the exchange of information with a network and/or other computing platforms. Illustration of user computing platform 104 in FIG. 1 is not intended to be limiting. The user computing platform 104 may include a plurality of hardware, software, and/or firmware components operating together to provide the functionality attributed herein to user computing platform 104. By way of non-limiting example, user computing platform 104 may include one or more of a desktop computer, a laptop computer, a handheld computer, a tablet computing platform, a NetBook, a Smartphone, a gaming console, and/or other computing platforms.

The server(s) 106 may include electronic storage 160, one or more processors 162, and/or other components. The server(s) 106 may include communication lines, or ports to enable the exchange of information with a network and/or other computing platforms. Illustration of server(s) 106 in FIG. 1 is not intended to be limiting. The server(s) 106 may include a plurality of hardware, software, and/or firmware components operating together to provide the functionality attributed herein to server(s) 106. For example, server(s) 106 may be implemented by a cloud of computing platforms operating together as server(s) 106.

Electronic storage 152, 156, and/or 160 may comprise non-transitory storage media that electronically stores information. The electronic storage media of electronic storage 152, 156, and/or 160 may include one or both of system storage that is provided integrally (i.e., substantially non-removable) with a respective component of system 100 and/or removable storage that is removably connectable to a respective component of system 100 via, for example, a port (e.g., a USB port, a firewire port, etc.) or a drive (e.g., a disk drive, etc.). Electronic storage 152, 156, and/or 160 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 152, 156, and/or 160 may include one or more virtual storage resources (e.g., cloud storage, a virtual private network, and/or other virtual storage resources). Electronic storage 152, 156, and/or 160 may store software algorithms, information determined by a processor, and/or other information that enables components of system 100 to function as described herein.

The processor(s) 154 of authentication device 102 may be configured to provide information processing capabilities in authentication device 102. As such, processor(s) 154 may include one or more of a digital processor, an analog processor, a digital circuit designed to process information, an analog circuit designed to process information, a state machine, and/or other mechanisms for electronically processing information. Although processor(s) 154 is shown in FIG. 1 as a single entity, this is for illustrative purposes only. In some implementations, processor(s) 154 may include a plurality of processing units. The processor(s) 154 may be configured to execute computer readable instruction components 116, 118, 120, 122, 124, and/or other components. The processor(s) 154 may be configured to execute components 116, 118, 120, 122, 124, and/or other components by software; hardware; firmware; some combination of software, hardware, and/or firmware; and/or other mechanisms for configuring processing capabilities on processor(s) 154.

The description of the functionality provided by the different components 116, 118, 120, 122, and/or 124 described herein is for illustrative purposes, and is not intended to be limiting, as any of components 116, 118, 120, 122, and/or 124 may provide more or less functionality than is described. For example, one or more of components 116, 118, 120, 122, and/or 124 may be eliminated, and some or all of its functionality may be provided by other ones of components 116, 118, 120, 122, and/or 124. As another example, processor(s) 154 may be configured to execute one or more additional computer readable instruction components that may perform some or all of the functionality attributed below to one of components 116, 118, 120, 122, and/or 124.

The processor(s) 158 of user computing platform 104 may be configured to provide information processing capabilities in user computing platform 104. As such, processor(s) 158 may include one or more of a digital processor, an analog processor, a digital circuit designed to process information, an analog circuit designed to process information, a state machine, and/or other mechanisms for electronically processing information. Although processor(s) 158 is shown in FIG. 1 as a single entity, this is for illustrative purposes only. In some implementations, processor(s) 158 may include a plurality of processing units. These processing units may be physically located within the same device, or processor(s) 158 may represent processing functionality of a plurality of devices operating in coordination. The processor(s) 158 may be configured to execute computer readable instruction components 128, 130, 131, 132, 133, 134, 136, and/or other components. The processor(s) 158 may be configured to execute components 128, 130, 131, 132, 133, 134, 136, and/or other components by software; hardware; firmware; some combination of software, hardware, and/or firmware; and/or other mechanisms for configuring processing capabilities on processor(s) 158.

It should be appreciated that although components 128, 130, 131, 132, 133, 134, and 136 are illustrated in FIG. 1 as being implemented within a single processing unit, in implementations in which processor(s) 158 includes multiple processing units, one or more of components 128, 130, 131, 132, 133, 134, and/or 136 may be implemented remotely from the other components. The description of the functionality provided by the different components 128, 130, 131, 132, 133, 134, and/or 136 described herein is for illustrative purposes, and is not intended to be limiting, as any of components 128, 130, 131, 132, 133, 134, and/or 136 may provide more or less functionality than is described. For example, one or more of components 128, 130, 131, 132, 133, 134, and/or 136 may be eliminated, and some or all of its functionality may be provided by other ones of components 128, 130, 131, 132, 133, 134, and/or 136. As another example, processor(s) 158 may be configured to execute one or more additional components that may perform some or all of the functionality attributed below to one of components 128, 130, 131, 132, 133, 134, and/or 136.

The processor(s) 162 of server(s) 106 may be configured to provide information processing capabilities in server(s) 106. As such, processor(s) 162 may include one or more of a digital processor, an analog processor, a digital circuit designed to process information, an analog circuit designed to process information, a state machine, and/or other mechanisms for electronically processing information. Although processor(s) 162 is shown in FIG. 1 as a single entity, this is for illustrative purposes only. In some implementations, processor(s) 162 may include a plurality of processing units. These processing units may be physically located within the same device, or processor(s) 162 may represent processing functionality of a plurality of devices operating in coordination. The processor(s) 162 may be configured to execute computer program instruction components 140, 142, 144, 146, 148, and/or other components. The processor(s) 162 may be configured to execute components 140, 142, 144, 146, 148, and/or other components by software; hardware; firmware; some combination of software, hardware, and/or firmware; and/or other mechanisms for configuring processing capabilities on processor(s) 162.

It should be appreciated that although components 140, 142, 144, 146, and 148 are illustrated in FIG. 1 as being implemented within a single processing unit, in implementations in which processor(s) 162 includes multiple processing units, one or more of components 140, 142, 144, 146, and/or 148 may be implemented remotely from the other components. The description of the functionality provided by the different components 140, 142, 144, 146, and/or 148 described below is for illustrative purposes, and is not intended to be limiting, as any of components 140, 142, 144, 146, and/or 148 may provide more or less functionality than is described. For example, one or more of components 140, 142, 144, 146, and/or 148 may be eliminated, and some or all of its functionality may be provided by other ones of components 140, 142, 144, 146, and/or 148. As another example, processor(s) 162 may be configured to execute one or more additional components that may perform some or all of the functionality attributed below to one of components 140, 142, 144, 146, and/or 148.

Figure 2:
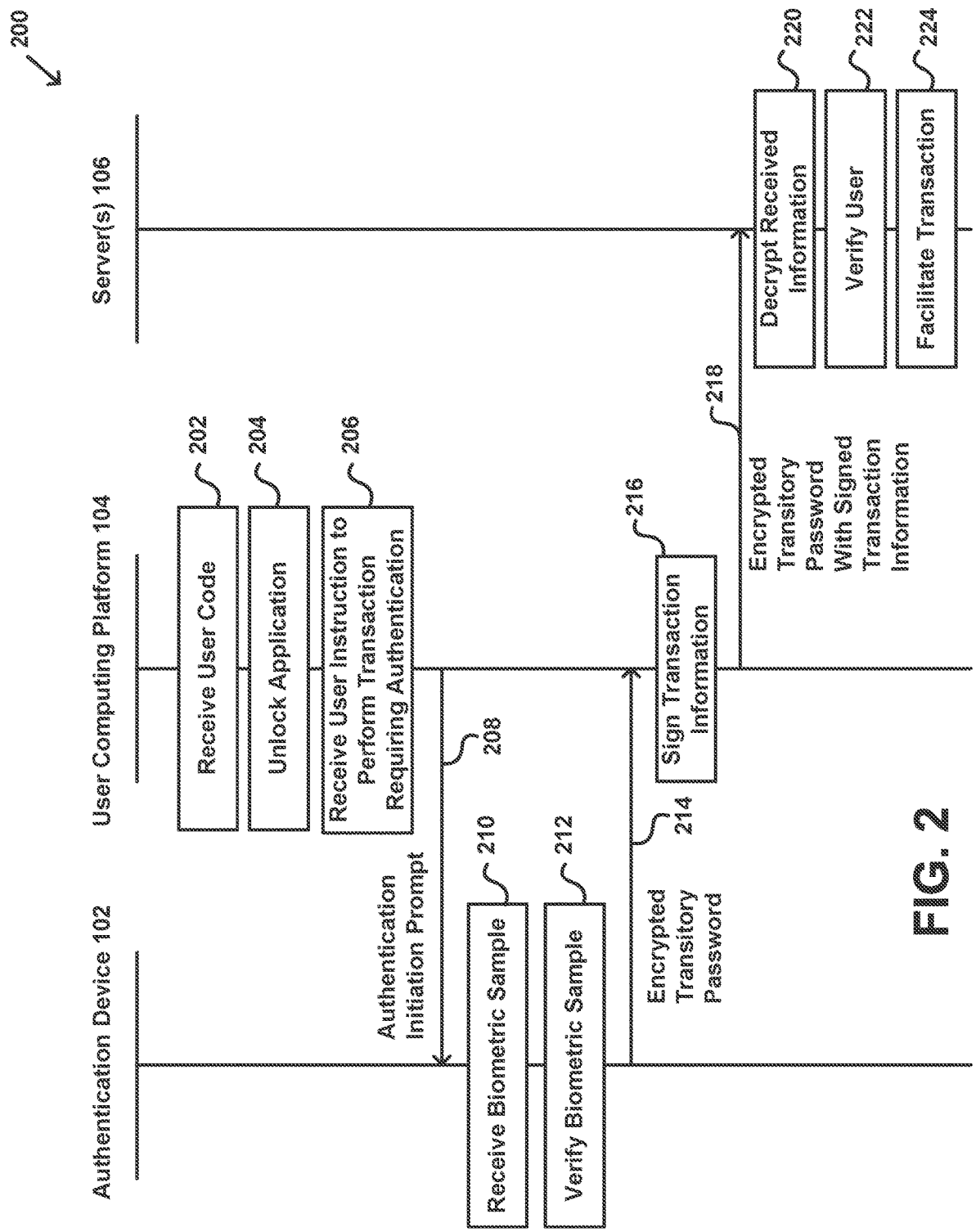
FIG. 2 illustrates a method for facilitating secure authentication using a biometric-enabled transitory password authentication device, in accordance with one or more implementations.

FIG. 2 illustrates a method 200 for facilitating secure authentication using a biometric-enabled transitory password authentication device, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a user code may be obtained from a user. Operation 202 may be performed at user computing platform 104. Operation 202 may be performed by one or more processors configured to execute a user code component that is the same as or similar to user code component 128, in accordance with one or more implementations.

At an operation 204, an application may be unlocked. The application may be running on a user computing platform (e.g., user computing platform 104) The application may be unlocked responsive to the correct user code being obtained (e.g., at operation 202). Operation 204 may be performed at user computing platform 104. Operation 204 may be performed by one or more processors configured to execute an unlock-app component that is the same as or similar to unlock-app component 130, in accordance with one or more implementations.

At an operation 206, a user instruction to perform a transaction requiring authentication may be received. Operation 206 may be performed at user computing platform 104. In some implementations, the user instruction may be received via a user interface presented by user computing platform 104. Operation 206 may be performed by one or more processors configured to execute a user-interface component that is the same as or similar to user interface component 132, in accordance with one or more implementations.

At an operation 208, an authorization initiation prompt may be provided to an authentication device (e.g., authentication device 102). The prompt may be configured to cause the authentication device to "wake up," turn on, become activated, and/or otherwise become ready to receive a biometric sample. The prompt may be provided by user computing platform 104 to authentication device 102. Operation 208 may be performed by one or more processors configured to execute an authentication initiation component that is the same as or similar to authentication initiation component 134, in accordance with one or more implementations.

At an operation 210, a biometric sample may be received from a biometric sensor. Operation 210 may be performed at authentication device 102. The biometric sample may be received from biometric sensor 108 of authentication device 102. Operation 210 may be performed by one or more processors configured to execute a biometric component that is the same as or similar to biometric component 116, in accordance with one or more implementations.

At an operation 212, the biometric sample may be verified. Operation 210 may be performed at authentication device 102. Operation 212 may be performed by one or more processors configured to execute a biometric component that is the same as or similar to biometric component 116, in accordance with one or more implementations.

At an operation 214, an encrypted transitory password may be transmitted to a user computing platform (e.g., user computing platform 104). The transitory password may be generated and encrypted at authentication device 102. The encrypted transitory password may be transmitted from authentication device 102 to user computing platform 104. Operation 214 may be performed by one or more processors configured to execute a one-way communications component that is the same as or similar to one-way communications component 124, in accordance with one or more implementations.

At an operation 216, transaction information may be signed. The transaction information may be associated with the transaction of operation 206. Signing the transaction information may be based on the encrypted transitory password. The transaction information may be encrypted based on the encrypted transitory password. The transaction information may include information that describes the transaction and/or information that is necessary to perform the transaction. Operation 216 may be performed at user computing platform 104. Operation 216 may be performed by one or more processors configured to execute a transaction component that is the same as or similar to transaction component 136, in accordance with one or more implementations.

At an operation 218, the encrypted transitory password may be transmitted with the signed transaction information to one or more servers (e.g., server(s) 106). The encrypted transitory password and the signed transaction information may be transmitted from user computing platform 104 to server(s) 106. Operation 218 may be performed by one or more processors configured to execute a transaction component that is the same as or similar to transaction component 136, in accordance with one or more implementations.

At an operation 220, the user may be verified. The user may be verified by determining whether the transitory password received from the user computing platform, once decrypted, is valid. Operation 220 may be performed at the server(s). Operation 220 may be performed by one or more processors configured to execute a verification component that is the same as or similar to verification component 146, in accordance with one or more implementations.

At an operation 224, the transaction may be facilitated. Facilitating the transaction may include effectuating one or more of authentication of third-party applications, authentication of debit card payments, authentication of regulated and secure digital currency (e.g., bitcoin) based payment services, use of credit cards via the NFC transmission protocol, QR-based authentication and payment services, and/or other transactions which require sensitive data. Operation 224 may be performed at server(s) 106. Operation 224 may be performed by one or more processors configured to execute a server-side transaction component that is the same as or similar to server-side transaction component 148, in accordance with one or more implementations.

Figure 3:
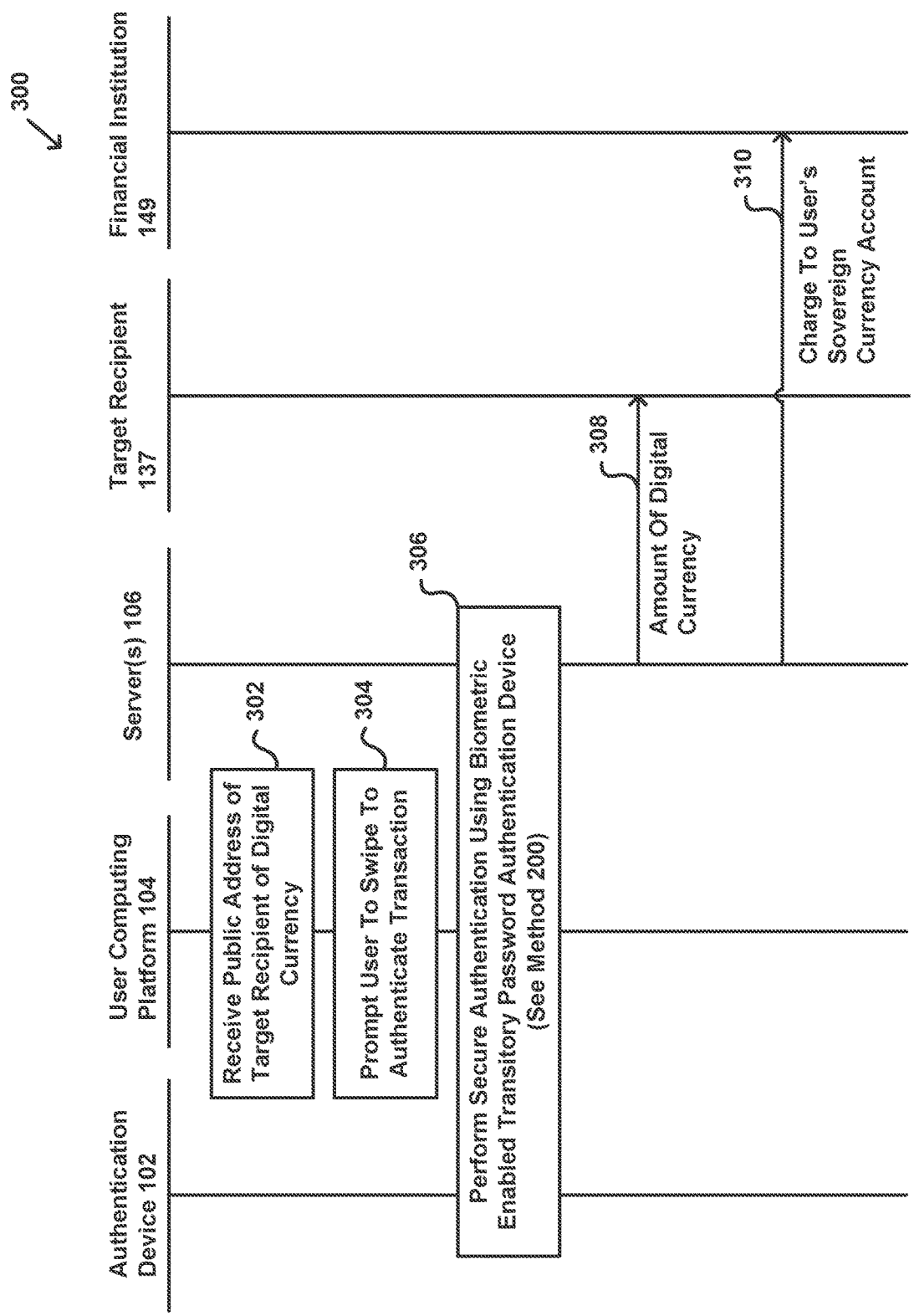
FIG. 3 illustrates a method for facilitating spending digital currency without owning digital currency, in accordance with one or more implementations.

FIG. 3 illustrates a method 300 for facilitating spending digital currency without owning digital currency, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a public address of a target recipient of digital currency may be received for a given transaction. Operation 302 may be performed at user computing platform 104. Operation 302 may be performed by one or more processors configured to execute a public address component that is the same as or similar to public address component 131, in accordance with one or more implementations.

At an operation 304, a prompt may be provided for the user to swipe-to-authenticate the transaction. Operation 304 may be performed at user computing platform 104. Operation 304 may be performed by one or more processors configured to execute a user prompt component that is the same as or similar to user prompt component 133, in accordance with one or more implementations.

At an operation 306, a secure authentication may be performed using a biometric enabled transitory password authentication device. In some implementations, operation 306 may include one or more operations of method 200 described in connection with FIG. 2. Operation 306 may be performed by coordination between authentication device 102, user computing platform 104, and server(s) 106.

At an operation 308, an amount of digital currency may be sent to the target recipient. Operation 308 may be performed at server(s) 106. Operation 308 may be performed by one or more processors configured to execute a server-side transaction component that is the same as or similar to server-side transaction component 148, in accordance with one or more implementations.

At an operation 310, a charge to a user's sovereign currency account for an equivalent amount of sovereign currency may be sent to a financial institution. Operation 310 may be performed at server(s) 106. Operation 310 may be performed by one or more processors configured to execute a server-side transaction component that is the same as or similar to server-side transaction component 148, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating transfer of digital currency, comprising:
   a user computing device having one or more processors and a tangible, non-transitory, machine-readable medium storing first instructions that when executed by the one or more processors of the user computing device effectuate operations comprising:
      obtaining a code associated with a transaction to be authenticated by a user;
      in response to obtaining the code, receiving instructions via a user interface for performing the transaction, the transaction requiring authentication of the user to transfer an amount of digital currency to a target; and
      generating a prompt to ready a device to authenticate the user; and
   an authentication device having one or more processors and a tangible, non-transitory, machine-readable medium storing second instructions that when executed by one or more processors of the authentication device effectuate operations comprising:
      readying a biometric sensor of the authentication device in response to wirelessly obtaining the prompt from the user computing device;
      receiving, using the biometric sensor of the authentication device, a biometric sample;
      verifying the received biometric sample as being indicative of the user based on stored biometric information corresponding to the user;
      in response to verifying the received biometric sample as being indicative of the user, generating encrypted authentication information corresponding to the transaction; and
      wirelessly transmitting, to the user computing device, the encrypted authentication information;
   wherein the first instructions, that when executed by the one or more processors of the user computing device, further effectuate operations comprising:
      receiving, from the authentication device, the encrypted authentication information corresponding to the transaction; and
      transmitting, to one or more servers, transaction information corresponding to the transaction by which the amount of digital currency is to be transferred to the target.

2. The system of claim 1, wherein obtaining a code associated with a transaction to be authenticated by a user comprises:
   obtaining a public address of the target, the transaction information indicating the public address of the target.

3. The system of claim 2, wherein the system further comprises:
   a server system having one or more processors and a tangible, non-transitory, machine-readable medium storing third instructions that when executed by the one or more processors of the server system effectuate operations comprising:
      obtaining the transaction information corresponding to the transaction by which the amount of digital currency is to be transferred to the target; and
      effectuating the transaction to transfer the amount of digital currency to the target, the transaction being indicative of a transfer in the amount from a digital currency wallet holding at least the amount of digital currency to the public address.

4. The system of claim 3, wherein:
   the user computing device reads a quick-response (QR) code indicative of the public address of the target.

5. The system of claim 3, wherein:
   the user computing device wirelessly receives a signal indicative of the public address of the target.

6. The system of claim 1, wherein:
   the user computing device generates, within a user interface of the user computing device, a user prompt indicating, to the user, that the user is to provide the biometric sample to the authentication device for authentication of the transmitting of the digital currency.

7. The system of claim 1, wherein:
   the one or more servers, in response to receiving transaction information, effectuate a transaction indicative of the amount of the digital currency to transmit to the target to deduct from an account associated with the user.

8. The system of claim 1, wherein wirelessly obtaining the prompt from the user computing device and wirelessly transmitting the encrypted authentication information to the user computing device comprises:
   placing the authentication device in physical proximity of the user computing device.

9. The system of claim 1, wherein obtaining a code associated with a transaction to be authenticated by a user comprises:
   reading a quick-response (QR) code indicative of a public address of the target.

10. A method for facilitating transfer of digital currency, the method comprising:
   obtaining a code associated with a transaction to be authenticated by a user;
   in response to obtaining the code, receiving instructions via a user interface of a user computing device for performing the transaction, the transaction requiring authentication of the user to transfer an amount of digital currency to a target;
   generating a prompt to ready an authentication device external to, and different from, the user computing device to authenticate the user;
   readying, by the authentication device, a biometric sensor of the authentication device responsive to wirelessly obtaining the prompt from the user computing device;
   receiving, using the biometric sensor of the authentication device, a biometric sample;

verifying the received biometric sample as being indicative of a user based on biometric information corresponding to the user stored on the authentication device;

generating, responsive to the received biometric sample being indicative of the user, encrypted authentication information corresponding to the transaction;

wirelessly obtaining, by the user computing device, the encrypted authentication information corresponding to the transaction from the authentication device; and transmitting, by the user computing device to one or more servers, transaction information corresponding to the transaction by which the amount of digital currency is to be transferred to the target.

11. The method of claim 10, wherein obtaining a code corresponding to a transaction to be authenticated by a user comprises:

obtaining a public address of the target, the transaction information indicating the public address of the target.

12. The method of claim 11, wherein:

the transaction is indicative of a transfer in the amount from a digital currency wallet holding at least the amount of digital currency to the public address.

13. The method of claim 12, wherein:

the user computing device reads a quick-response (QR) code indicative of the public address of the target.

14. The method of claim 12, wherein:

the user computing device wirelessly receives a signal indicative of the public address of the target.

15. The method of claim 10, wherein:

the user computing device generates, within a user interface of the user computing device, a user prompt indicating, to the user, that the user is to provide the biometric sample to the authentication device for authentication of the transmitting of the digital currency.

16. The method of claim 10, wherein:

the one or more servers, in response to receiving transaction information, effectuate a transaction indicative of the amount of the digital currency to transmit to the target to deduct from an account associated with the user.

17. The method of claim 10, wherein wirelessly obtaining the prompt from the user computing device and wirelessly obtaining the encrypted authentication information by the user computing device comprises:

placing the authentication device and the user computing device in physical proximity.

18. The method of claim 10, wherein the authentication device transmits information to the user computing device only in response to verification of biometric samples as being indicative of the user.

19. The method of claim 10, wherein:

at least some of the transaction information corresponding to the transaction is signed.

20. The method of claim 10, further comprising:

means to verify a biometric sample.

21. A tangible, non-transitory, machine-readable medium or mediums storing instructions that when executed by one or more processors effectuate operations for facilitating transfer of digital currency, the operations comprising:

obtaining a code associated with a transaction to be authenticated by a user;

in response to obtaining the code, receiving instructions via a user interface of a user computing device for performing the transaction, the transaction requiring authentication of the user to transfer an amount of digital currency to a target;

generating a prompt to ready an authentication device external to, and different from, the user computing device to authenticate the user;

readying, by the authentication device, a biometric sensor of the authentication device responsive to wirelessly obtaining the prompt from the user computing device;

receiving, using the biometric sensor of the authentication device, a biometric sample;

verifying the received biometric sample as being indicative of a user based on biometric information corresponding to the user stored on the authentication device;

generating, responsive to the received biometric sample being indicative of the user, encrypted authentication information corresponding to the transaction;

wirelessly obtaining, by the user computing device, the encrypted authentication information corresponding to the transaction from the authentication device; and transmitting, by the user computing device to one or more servers, transaction information corresponding to the transaction by which the amount of digital currency is to be transferred to the target.

22. The non-transitory machine-readable medium or mediums of claim 21, wherein obtaining a code corresponding to a transaction to be authenticated by a user comprises:

obtaining a public address of the target, the transaction information indicating the public address of the target.

23. The non-transitory machine-readable medium or mediums of claim 22, wherein:

the transaction is indicative of a transfer in the amount from a digital currency wallet holding at least the amount of digital currency to the public address.

24. The non-transitory machine-readable medium or mediums of claim 23, wherein:

the user computing device reads a quick-response (QR) code indicative of the public address of the target.

25. The non-transitory machine-readable medium or mediums of claim 23, wherein:

the user computing device wirelessly receives a signal indicative of the public address of the target.

26. The non-transitory machine-readable medium or mediums of claim 21, wherein:

the user computing device generates, within a user interface of the user computing device, a user prompt indicating, to the user, that the user is to provide the biometric sample to the authentication device for authentication of the transmitting of the digital currency.

27. The non-transitory machine-readable medium or mediums of claim 21, wherein:

the one or more servers, in response to receiving transaction information, effectuate a transaction indicative of the amount of the digital currency to transmit to the target to deduct from an account associated with the user.

28. The non-transitory machine-readable medium or mediums of claim 21, wherein wirelessly obtaining the prompt from the user computing device and wirelessly obtaining the encrypted authentication information by the user computing device comprises:

wirelessly obtaining the prompt from the user computing device and wirelessly obtaining the encrypted authentication information by the user computing device while the authentication device and the user computing device are in physical proximity.

29. The non-transitory machine-readable medium or mediums of claim 21, wherein the authentication device transmits information to the user computing device only in response to verification of biometric samples as being indicative of the user.

30. The non-transitory machine-readable medium or mediums of claim 21, wherein:
   at least some of the transaction information corresponding to the transaction is signed.

31. The non-transitory machine-readable medium or mediums of claim 21, further comprising:
   means to verify a biometric sample.

* * * * *